United States Patent [19]

Bacardit

[11] 4,285,267
[45] Aug. 25, 1981

[54] CONTROL DEVICE FOR HYDRAULIC SERVOMECHANISMS

[75] Inventor: Juan S. Bacardit, Barcelona, Spain

[73] Assignee: Bendiberica, S.A., Barcelona, Spain

[21] Appl. No.: 90,204

[22] Filed: Nov. 1, 1979

[30] Foreign Application Priority Data

Nov. 2, 1978 [ES] Spain .................................. 474.738

[51] Int. Cl.³ ............................................. F15B 13/04
[52] U.S. Cl. ........................................ 91/434; 91/441; 91/447
[58] Field of Search .................. 91/434, 441, 447, 463

[56] References Cited

U.S. PATENT DOCUMENTS

| | | | |
|---|---|---|---|
| 3,939,757 | 2/1976 | Jablonsky | 91/441 X |
| 4,052,929 | 10/1977 | Baatrup et al. | 91/433 X |
| 4,195,552 | 4/1980 | Neff | 91/447 X |

*Primary Examiner*—Gerald A. Michalsky
*Attorney, Agent, or Firm*—Paul David Schoenle; Ken C. Decker

[57] ABSTRACT

A control system for hydraulic servomechanisms comprising a double-acting jack the working chambers of which are selectively and alternately connectable to a source of pressurized fluid and to a fluid discharge through a reactive switching valve which itself is operated by a control member.

According to the invention, there are provided between the valve and each working chamber of the jack means for intercepting the passage of fluid toward said chamber as long as the upstream pressure does not reach a predetermined threshold value.

The application may be advantageously used in power-assisted steering systems for automotive vehicles.

1 Claim, 3 Drawing Figures

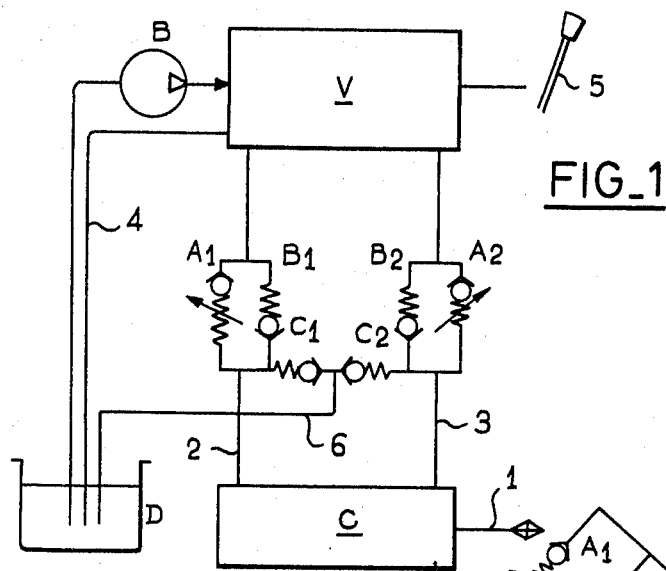
FIG_1
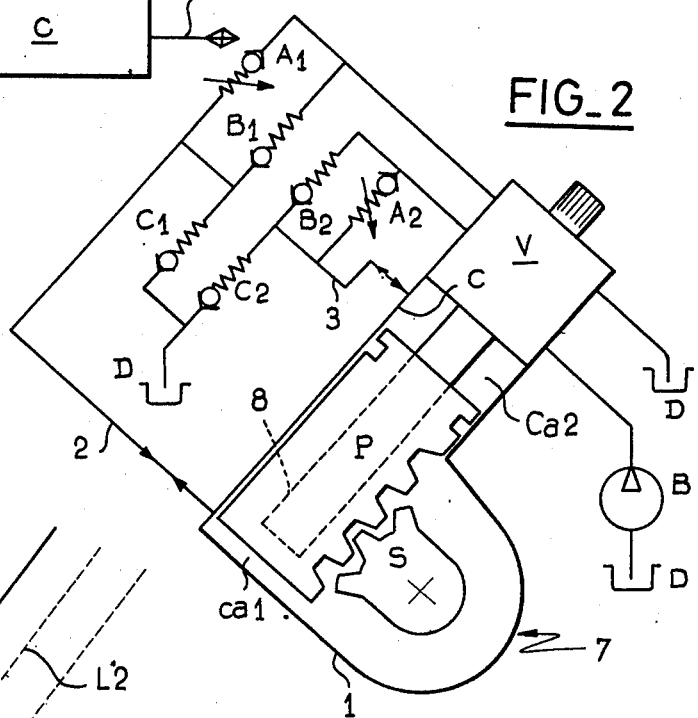
FIG_2
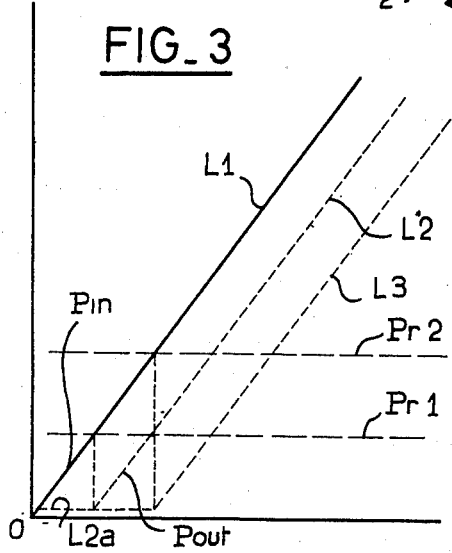
FIG_3

CONTROL DEVICE FOR HYDRAULIC SERVOMECHANISMS

The invention relates to the control of hydraulic servomechanisms which comprise two opposing working chambers which are separated from each other in a fluid-tight manner by a movable body which is connected to the device to be operated, the two chambers being selectively connectable to a source of fluid under pressure or a fluid discharge, via a switching valve which can be operated by a control member, the displacement of this latter being opposed by a pressure which is proportional to the pressure of the fluid which has been led into the chamber which has been operated on by this displacement. In this way a reaction is obtained in the control member which informs the operator of the force which the servomechanism is developing at any time.

A typical application of such hydraulic servomechanisms is that of power-assisted steering, used in motor vehicles, in which the control member is constituted by the shaft associated to the steering wheel and is connected to the mechanism of the latter via a lost motion coupling, the two mutually displaceable parts of the valve being rigidly connected to the said shaft and the said mechanism.

With specific reference to this application, it will be appreciated that it is desirable to provide the valve with a good degree of sensitiveness, this meaning that the servomechanism responds immediately to the slightest movement of the steering wheel. This, however, is a disadvantage when the vehicle is running in a straight line and the servomechanism is in the region of the centre point of its stroke, since in this region the servomechanism reacts immediately to even the smallest input torque, giving rise to instability of operation under these conditions. In practice it is consequently necessary to adopt compromise solutions which are not always completely satisfactory.

It is an object of this invention to eliminate this disadvantage by providing a control system for hydraulic servomechanisms of the above defined type, thanks to which it is possible to modulate the central point of operation of the system by making it necessary to provide an input or operating torque of a predetermined magnitude, which can be adjusted within certain limits, before corresponding effective operation of the servomechanism is produced.

In order to achieve this object, in accordance with the invention, the conduit which communicates each one of the pressure outlets of the reactive control valve with a corresponding working chamber of the operating device, has means located therein for intercepting the passage of fluid passing from the valve to the chamber and which respond to an increase in upstream pressure in the said conduit in order to open up a passage for fluid when the said pressure reaches a predetermined threshold value, corresponding to a desired initial reaction.

In the majority of cases, return, in the direction from the chamber to the valve, of the fluid which has provided operation in the previous cycle, occurs through the same conduit, so that such means for interception would now make this fluid return impossible. In accordance with a further feature of the invention, this is prevented by providing a back-pressure valve in parallel relationship to the means for interception and which is adapted to allow passage of fluid in the return direction.

When the system operates in the region of the central point, or in other words, within the limits determined by the adjustment pressure of the means for interception, hydraulic locking of the whole unit clearly occurs, which can be a disadvantage; for example, in the case of servo-assisted steering, when it is desired that a certain freedom of movement does exist within the central region, or in order to make steering possible without hydraulic assistance. In these cases it is possible to eliminate such locking by providing, between each one of the working chambers of the operating device and the fluid reservoir, a communication which is controlled by a one-way valve which is adapted so as to allow passage of fluid from the reservoir to the chamber, when the operated device is displaced by an external force which has the effect of increasing the volume of the chamber.

The means for intercepting the fluid may take very many forms. In a preferred embodiment, a one-way valve is provided which is designed so as to allow fluid circulation in a direction from the valve to the corresponding working chamber, which is urged into a closed position by means of a loading device which provides an effort corresponding to the desired threshold pressure. The loading device may be an elastic device, advantageously having a rating which can be adjusted to a predetermined operating point, or may even be associated with a regulating device which automatically responds to an external variable.

The attached drawings show, by way of example which does not limit the scope of the present invention and in diagrammatical representation, one preferred practical embodiment of the invention.

In the drawings,

FIG. 1 is an overall view of the system, which illustrates its principle of operation when applied to the actuation of a double-acting hydraulic cylinder;

FIG. 2 shows the application of the system to servo-assisted steering with a reactive control valve incorporated in the steering mechanism, and FIG. 3 is a pressure diagram which corresponds to the operation of the two previous embodiments.

FIG. 1 relates to the actuation of a double-acting hydraulic operating cylinder C, for operating any external device whatsoever, not shown, in both directions, which is fixed to its connecting rod 1. In order to achieve this, the two chambers of the cylinder are connected by means of conduits 2 and 3 to the pressure outputs of a switching valve V, which itself has an inlet connected to a pump B which draws hydraulic fluid from a reservoir D, and a discharge outlet 4 which returns working fluid to this reservoir. Valve V is of any conventional type, which can be actuated by a control member 5 and has a central rest position, in which it does not deliver fluid to either of the cylinder chambers, or, in other words, maintains an identical pressure in the conduits 2 and 3, and two working positions, located on both sides of the central position and in each one of which hydraulic fluid is delivered, or the pressure of the same is increased, to one of the conduits 2 and 3. It will also be assumed that the valve is of the reactive type, this meaning that the delivery pressure acts on the operating member in order to provide a reaction at the control member which is proportional to this pressure or to the final force developed by the system.

Thus, the operating conditions could be represented by the line L1 in the graph shown in FIG. 3, which shows the delivery pressure from the valve as a function of the input torque applied to the control member 5. At the origin O the control member 5 is located in its central rest position and no operating torque is applied; the pressure or the pressure difference in the output lines 2 and 3 is zero. As soon as an operating torque is applied however small this may be, a corresponding delivery pressure is produced. From this it can be seen that, under real operating conditions, if the device which is being operated on by the system absorbs variable reactions or the control member is subject to small oscillations about its central position, the operation of the system would be represented by a series of small oscillations about a straight line, which corresponds to the rest position.

In accordance with the invention, two pairs of one-way valves A1, B1 and A2, B2 are inserted in the conduits 2 and 3, in such a way that each pair of valves is arranged so that the fluid from one of the said conduits passes there through, and the valves of each pair are connected in parallel, although in opposition, in such a way that the valves A are intended for the passage of working fluid, whilst the valves B have the return fluid passing therethrough in each case.

The one-way return valves B are loaded in a known manner, so that they remain shut in the absence of pressure at their input side, that is, the side of operating cylinder C.

The one-way valves A, however, are shown in the drawings to have an adjustable loading, so that it is possible to adjust the pressure at the input side (at the switching valve B side) which must build up before opening occurs and there is passage of fluid under pressure to the operating cylinder. Accordingly (FIG. 3), when an input torque is applied to control member 5 which increases in magnitude starting from the origin O, the pressure acting against the corresponding valve A will increase, for example more or less according to line L1, whilst the output pressure, or in other words the response pressure from the control unit, will remain practically at zero, following the portion L2a of the curve L2; when the input pressure Pin reaches the adjusted or rated pressure Pr1 the valve A opens, the input pressure tends to equalise the output pressure Pout and from this moment a proportional relationship is established between the input torque applied and the output pressure of the system, following curve L2. This operation is fully reversible. Curve L3 shows a differing response, corresponding to a further adjustment pressure Pr2.

From the above it will be seen that the servo-system will not respond to small values of the input torque, which lie within the horizontal portion of the response curves, thus eliminating unnecessary small oscillations about the zero or central point.

FIG. 1 also shows two other one-way valves C1 and C2, which are connected between the conduits 2 and 3 connected to the two opposing chambers of cylinder C and a conduit 6 which discharges below the hydraulic fluid level in reservoir D. These valves are arranged so that they close in the operating direction of each one of the chambers and do not affect normal operation of the system, but do allow drawing in of hydraulic fluid, when one of the chambers of cylinder C tends to have its volume increased as a result of an external mechanism stress, received by connecting rod 1, such as when the system is being operated manually when there is a fault in the hydraulic power assistance.

FIG. 2 shows a typical application of the control system to servo-assisted steering for motor vehicles, in which the switching valve V is incorporated into the steering mechanism 7, and the cylinder C comprises two chambers Ca1, Ca2 which are separated by a piston carrying a toothed rack P intended to actuate the toothed sector S connected to the steering linkage. It will be obvious that the piston can also be operated by means of a conventional worm mechanism 8 which is connected to one of the mutually displaceable members of valve V, and that the control member 5, which is connected to the other movable member of the valve and is connected to the worm by means of a lost motion coupling which makes the operating motion of the valve possible, is connected in the usual manner to the steering column of the vehicle. Parts which are also common to FIG. 1 are shown using the same reference numerals. The way of operation in this case is the same as described above.

What is claimed is:

1. In a control device for hydraulic servomechanisms, of the type comprising two opposed working chambers which are separated from each other in a fluid-tight manner by a movable member which is connected to the device to be operated, the two chambers being selectively and alternately connectable to a source of fluid under pressure or fluid discharge by means of a pair or conduits and a switching valve which can be operated by a control member, the fluid discharge and the source of fluid pressure being in communication with a reservoir, the displacement of the switching valve being opposed by a pressure which is proportional to the pressure of the fluid which has been led into the chamber which is actuated as a result of said displacement, the improvement wherein each of said pair of conduits which communicates each one of the pressure outlets of the switching valve with a corresponding working chamber of the operating device includes a pair of one-way valves connected in parallel with said conduit, said operating device receiving fluid pressure during operation of the control member only through said pair of one-way valves, one of said pair of one-way valves solely providing for fluid communication from said switching valve to said operating device, said one one-way valve being adjustable to open communication only above a predetermined pressure level, said other one-way valve providing for fluid communication from said operating device to said switching valve, and said pair of conduits further communicating via a second conduit with said reservoir independently of said pair of one-way valves, said second conduit including separate branches for each conduit and said separate branches including one-way valves permitting fluid communication only from said reservoir to said operating device independently of said pair of one-way valves.

* * * * *